United States Patent [19] [11] 4,174,911
Maccario et al. [45] Nov. 20, 1979

[54] STRUCTURAL STEEL CLAMPED JOINT

[76] Inventors: Floriano A. Maccario, 12233 - 135 St., Edmonton, Alberta, Canada, T5L 1W9; Tommaso Affinita, Corso Liberta 3, 46100 Mantova, Italy

[21] Appl. No.: 949,789

[22] Filed: Oct. 10, 1978

[30] Foreign Application Priority Data

Jun. 30, 1978 [CA] Canada ................................ 306589

[51] Int. Cl.² .................... B25G 3/00; F16B 7/04; F16D 1/00; F16G 11/00
[52] U.S. Cl. .................................. 403/303; 403/405; 403/373; 403/390; 52/726; 52/732
[58] Field of Search ............... 403/303, 311, 312, 314, 403/363, 373, 380, 389, 390, 405; 52/693, 694, 726, 730, 732

[56] References Cited
U.S. PATENT DOCUMENTS

| 1,221,946 | 4/1917 | Youmans | 403/314 |
| 1,953,145 | 4/1934 | Wilson | 403/390 |
| 3,413,813 | 12/1968 | Rock et al. | 403/363 X |
| 3,900,269 | 8/1975 | Pavlot | 403/363 X |

Primary Examiner—Wayne L. Shedd
Attorney, Agent, or Firm—Ernest Peter Johnson

[57] ABSTRACT

A joint for structural steel is provided which connects a pair of parallel beams in end-to-end relationship with a second pair of parallel beams. The beams are of any cross-sectional form having an L-shaped component, for example an inverted "S." The beams are retained in a U-shaped channel having two upstanding side walls and a bottom wall connecting the side walls. The bottom wall is provided with one or more centrally located holes.

The joint is formed by nesting two pairs of parallel beams in end-to-end relationship within the U-shaped channel. The width of the channel is such that the seating bases of the L-shaped beams do not obstruct the holes in the bottom wall of the U-shaped channel. A clamping plate having holes aligning with the holes of the bottom wall of the channel is fitted into the channel over the seating bases of the beams. Means, such as a nut and bolt, are used to bind the clamping plate onto the U-shaped channel. The clamping plate thereby pushes the beams outwardly against the side walls of the U-shaped channel and downwardly against the bottom wall of the channel.

1 Claim, 5 Drawing Figures

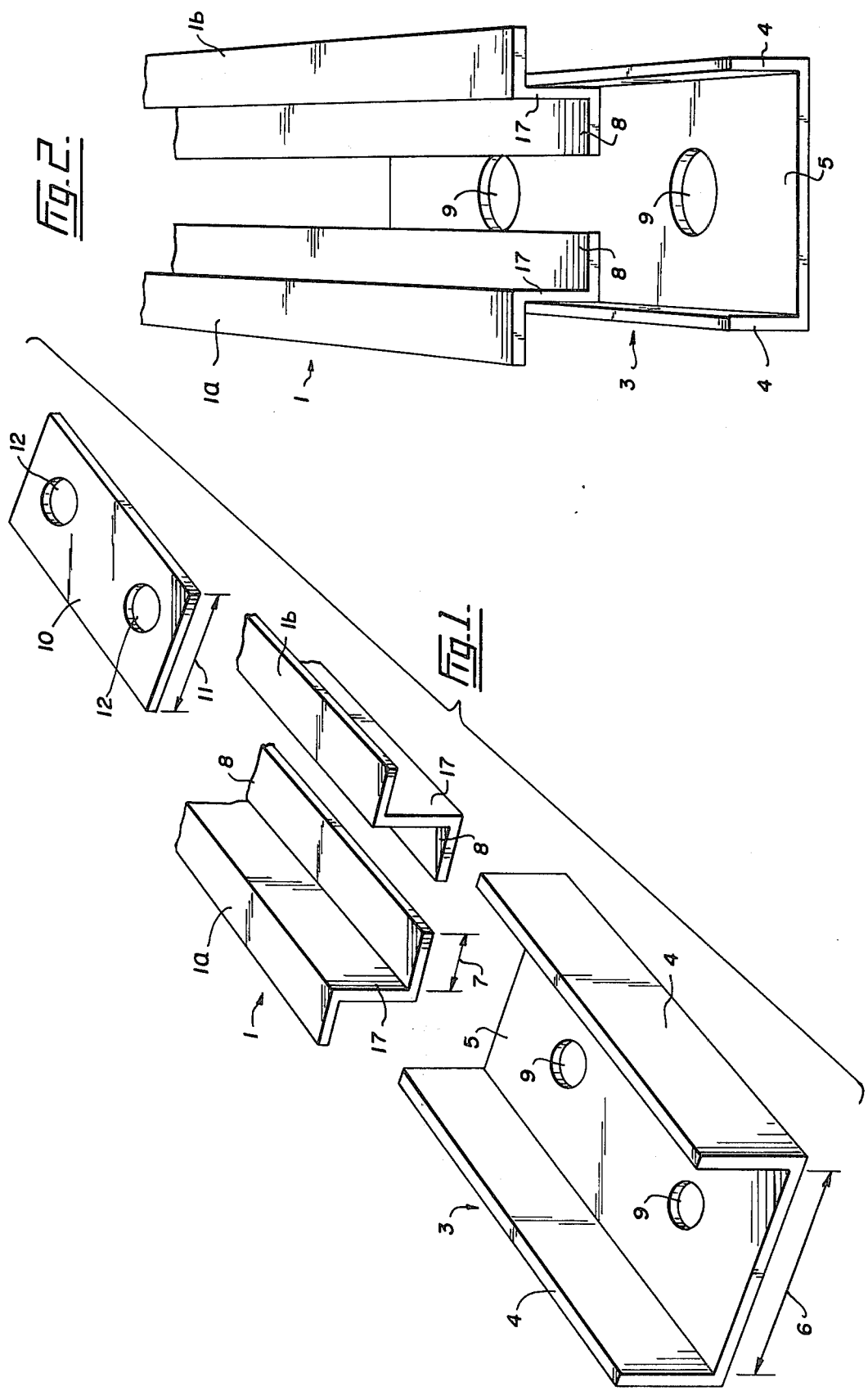

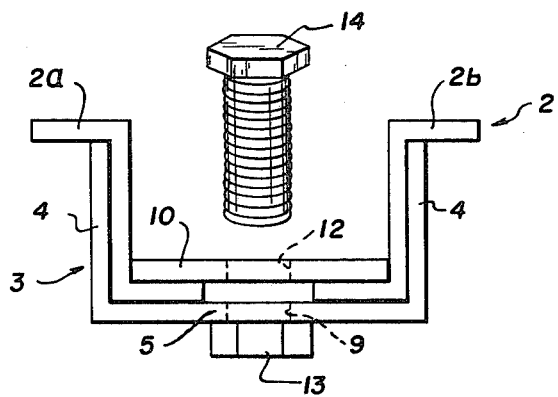
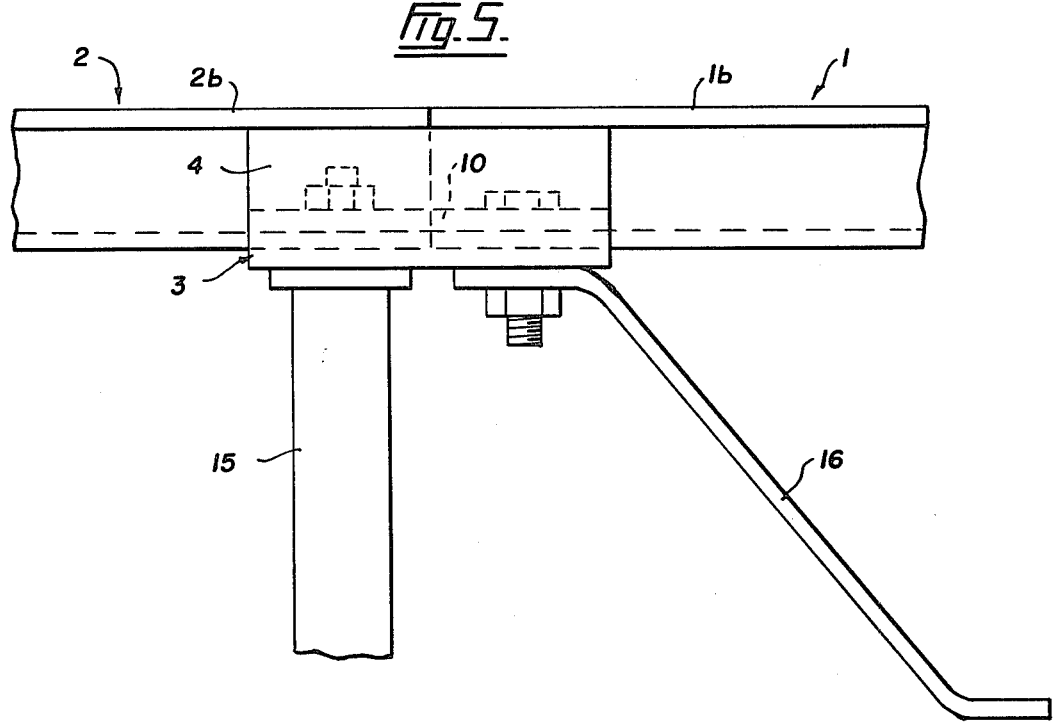

STRUCTURAL STEEL CLAMPED JOINT

BACKGROUND OF THE INVENTION

This invention relates to a system for connecting structural beams in an end-to-end relationship.

It is known to connect a single "T" or "I" shaped beam end-to-end to a second beam by drilling holes into the beams and using nuts and bolts to join them. This is undesirable as weak spots are formed at the loci of the holes. An alternate method involves welding the beams together. This operation requires a skilled worker and provides a joint which is not easily disassembled if desired.

SUMMARY OF THE INVENTION

In accordance with the present invention, a joint for structural steel is provided which connects a pair of parallel beams in end-to-end relationship with a second pair of parallel beams. The beams are L-shaped or of any cross-sectional form having an L-shaped component, for example an inverted "S". The beams are retained in a U-shaped channel having two upstanding side walls and a bottom wall connecting the side walls. The bottom wall is provided with one or more centrally located holes.

The joint is formed by nesting two pairs of parallel beams in end-to-end relationship within the U-shaped channel. The width of the channel is such that the seating bases of the L-shaped beams do not obstruct the holes in the bottom wall of the U-shaped channel. A clamping plate having holes aligning with the holes of the bottom wall of the channel is fitted into the channel over the seating bases of the beams. Means, such as a nut and bolt, are used to bind the clamping plate onto the U-shaped channel. The clamping plate thereby pushes the beams outwardly against the side walls of the U-shaped channel and downwardly against the bottom wall of the channel.

This joint is particularly useful in the erection of temporary buildings and can be quickly assembled or disassembled by unskilled help.

Broadly stated, the present invention provides a joint for structural steel comprising: a first pair of parallel beams having a cross-sectional form with an L-shaped component; a second pair of parallel beams having a cross-sectional form with an L-shaped component; a U-shaped channel having two upstanding side walls and a bottom wall connecting the side walls, the bottom wall having one or more centrally located holes therethrough; said first and second pairs of parallel beams nesting within the U-shaped channel in end-to-end relationship without obstructing the holes of the bottom wall of the U-shaped channel; a clamping plate fitting into the U-shaped channel over the beams and having one or more holes aligning with said holes in the bottom wall of the U-shaped channel; and means for binding the clamping plate and the U-shaped channel together, said clamping plate forcing the said beams outwardly against the side walls of the U-shaped channel and downwardly against the bottom wall of the U-shaped channel.

DESCRIPTION OF THE DRAWINGS

FIG. 1 is a perspective exploded view showing the U-shaped channel, a pair of parallel beams and the clamping plate;

FIG. 2 is a perspective view showing a first pair of parallel beams nested within the U-shaped channel;

FIG. 4 is a front view showing the clamping plate in place; and

FIG. 5 is a side view showing an assembled joint and additionally showing the attachment of a vertical beam and of a joist.

DESCRIPTION OF THE PREFERRED EMBODIMENT

Figure 3:
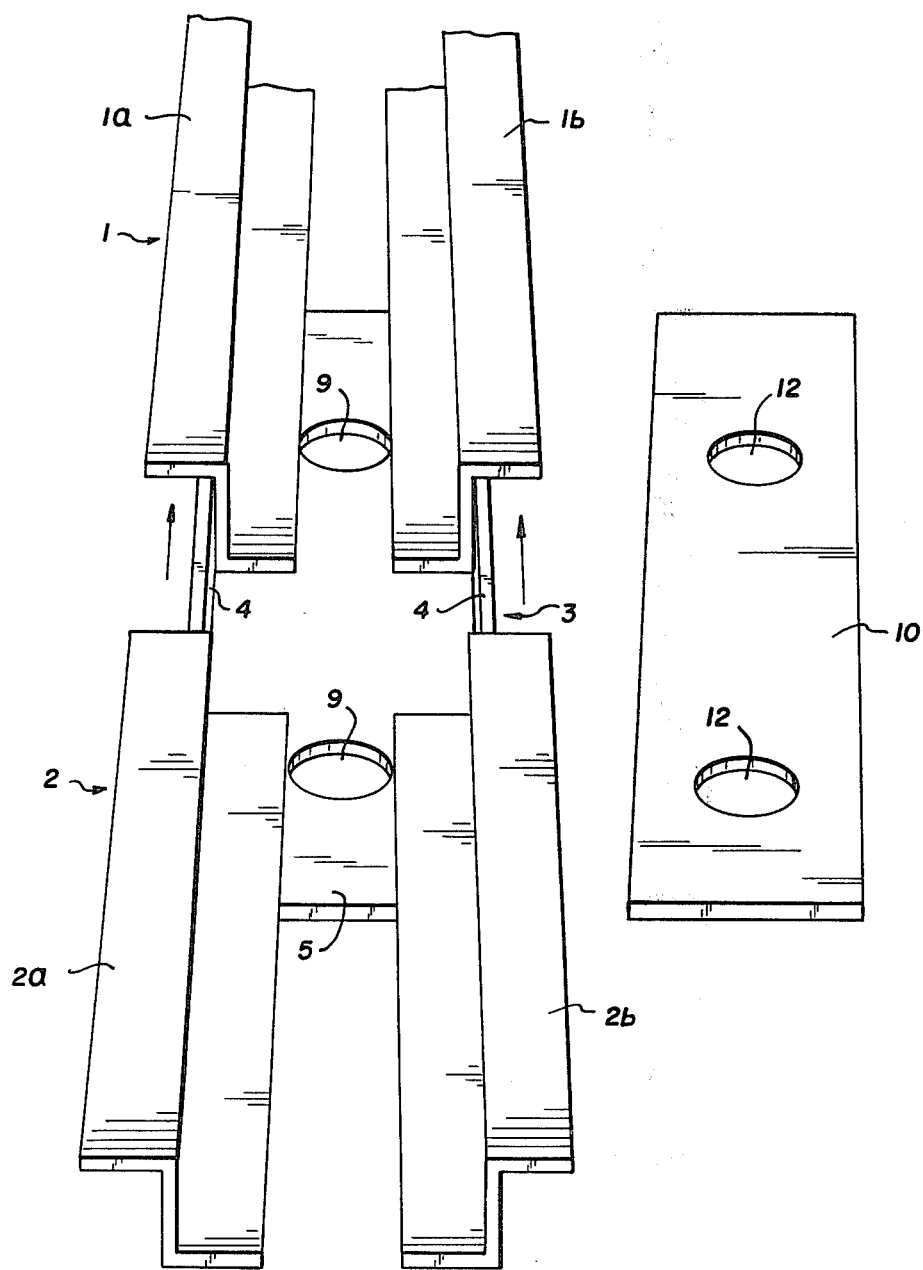
FIG. 3 is a perspective view showing a first and second pair of parallel beams nested within the U-shaped channel and additionally shows the clamping plate.

The joint of the present invention is formed between two parallel pairs 1, 2 of beams as shown in FIGS. 1 to 5.

The beams 1, 2 nest within a U-shaped channel 3 having two upstanding side walls 4 and a bottom wall 5 connecting the side walls. The beams are of a cross-sectional form having an L-shaped component comprised of base 8 and wall 17 so that they can be seated against the inner surface of the U-shaped channel 3. In the preferred embodiment shown, the beams are S-shaped.

The width 6 of the U-shaped channel 3 is greater than twice the base length 7 of the beams so that the seating bases 8 of a parallel pair of beams are spaced apart when in place, as shown in FIG. 2. In this manner, holes 9 in the bottom wall 5 of the U-shaped channel are left unobstructed.

A clamping plate 10, preferably having a width 11 slightly smaller than the difference between the inside width 6 of the channel and twice the thickness of the beams, is provided with holes 12 which match holes 9 in the U-shaped channel. This plate will be used to secure the beams within the channel.

The joint is assembled as follows: a first pair of parallel beams 1a, 1b is seated inside the U-shaped channel 3. A second pair of parallel beams 2a, 2b is brought in end-to-end relationship with the first set 1 of beams, as shown in FIG. 3. Holes 9 on the bottom wall 5 of the U-shaped channel 3 remain uncovered. The clamping plate 10 is then placed inside the channel 3 over the beams such that the holes 12 in the plate 10 align with holes 9 in the U-shaped channel 3. Means, such as a nut 13 and bolt 14, are used to bind the clamping plate 10 and the U-shaped channel 3 together. The clamping plate then forces the beams outwardly against the side walls 4 of the channel and downwardly against the bottom wall 5 of the channel thereby securely holding the two pairs of parallel beams in end-to-end relationship.

In an alternate embodiment, shown in FIG. 5, the bolts can be used to attach a vertical riser beam 15 and angled beam or joist 16.

While the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined as follows:

1. A joint for structural steel comprising:
   a first pair of parallel beams having a cross-sectional form with an L-shaped component;
   a second pair of parallel beams having a cross-sectional form with an L-shaped component;

a U-shaped channel having two upstanding side walls and a bottom wall connecting the side walls, the bottom wall having one or more centrally located holes therethrough;

said first and second pairs of parallel beams nesting within the U-shaped channel in end-to-end relationship without obstructing the holes of the bottom wall of the U-shaped channel;

a clamping plate fitting into the U-shaped channel over the beams and having one or more holes aligning with the holes in the bottom wall of the U-shaped channel; and means for binding the clamping plate and the U-shaped channel together, said clamping plate forcing the beams outwardly against the side walls of the U-shaped channel and downwardly against the bottom wall of the U-shaped channel.

* * * * *